US009005693B2

(12) United States Patent
Deka et al.

(10) Patent No.: US 9,005,693 B2
(45) Date of Patent: Apr. 14, 2015

(54) ARTIFICIAL FINGERPRINT MATERIAL, PROCESS OF APPLICATION, AND METHOD OF EVALUATING FINGERPRINT RESISTANCE QUALITIES OF A SURFACE

(71) Applicant: Whirlpool Corporation, Benton Harbor, MI (US)

(72) Inventors: Lakshya J. Deka, Mishawaka, IN (US); Yen-Hsi Lin, Saint Joseph, MI (US); Lisa R. Schneider, South Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 184 days.

(21) Appl. No.: 13/718,234

(22) Filed: Dec. 18, 2012

(65) Prior Publication Data

US 2014/0170321 A1      Jun. 19, 2014

(51) Int. Cl.
| A61B 5/103 | (2006.01) |
| A61B 5/117 | (2006.01) |
| C09D 5/00 | (2006.01) |
| B05C 17/12 | (2006.01) |

(52) U.S. Cl.
CPC .. *C09D 5/00* (2013.01); *B05C 17/12* (2013.01)

(58) Field of Classification Search
USPC .................................................... 427/1, 256
See application file for complete search history.

(56) References Cited

U.S. PATENT DOCUMENTS

| 7,186,438 | B2 | 3/2007 | Hayashida et al. |
| 7,235,125 | B2 | 6/2007 | Hayashida et al. |
| 7,264,860 | B2 | 9/2007 | Hayashida et al. |
| 7,493,801 | B2 | 2/2009 | Hayashida et al. |
| 7,571,077 | B2 * | 8/2009 | Seo et al. ...................... 702/183 |
| 7,638,171 | B2 * | 12/2009 | Hayashida et al. ........... 427/256 |
| 2007/0280516 | A1 | 12/2007 | Yoneyama et al. |

FOREIGN PATENT DOCUMENTS

| JP | 2009122416 A * | 6/2009 |
| WO | 03/029382 A1 | 4/2003 |

OTHER PUBLICATIONS

Wu et al. Quantitative test method for evaluation of anti-fingerprint property of coated surfaces, Applied Surface Science, 257 (2011) pp. 2965-2969.*
Linda Y.L. Wu; S.K. Ngian; Z. Chen; D.T.T. Xuan, Quantitative Test Method for Evaluation of Anti-Fingerprint Property of Coated Surfaces, Applied Surface Science, October 20, 2010, pp. 2965-2969, 2010 Elsevier B.V.

* cited by examiner

*Primary Examiner* — Kelly M Gambetta

(57) ABSTRACT

An artificial fingerprinting solution that includes a heated blend of glyceryl trioleate and artificial sebum configured to approximate the fingerprint oil of a human. The artificial fingerprinting solution may also be included in a kit that also includes an artificial fingerprint stamp that has an artificial fingerprint transfer member that imitates a human fingerprint and is capable of receiving and holding at least a portion of the artificial fingerprint solution when the artificial fingerprinting transfer member contacts the artificial fingerprint solution.

20 Claims, 8 Drawing Sheets

ARTIFICIAL FINGERPRINT MATERIAL, PROCESS OF APPLICATION, AND METHOD OF EVALUATING FINGERPRINT RESISTANCE QUALITIES OF A SURFACE

SUMMARY OF THE INVENTION

An embodiment of the present disclosure is generally directed toward an artificial fingerprinting solution, an artificial sebum that includes a heated blend of glyceryl trioleate and dissolved artificial sebum configured to approximate the fingerprint oil of a human.

Yet another aspect of the present disclosure is generally directed toward a kit that includes an artificial fingerprinting solution, an artificial sebum, that includes a heated blend of glyceryl trioleate and dissolved artificial sebum configured to approximate the fingerprint oil of a human and an artificial fingerprint stamp that has an artificial fingerprint transfer member that imitates a human fingerprint and is capable of receiving and holding at least a portion of the artificial fingerprint solution when the artificial fingerprinting transfer member contacts the artificial fingerprint solution.

Another aspect of the present disclosure is generally directed towards a process that includes the steps of: preparing an artificial fingerprint forming material by combining at least glyceryl trioleate and an artificial sebum and heating the artificial fingerprinting forming material to form the artificial fingerprint forming material, where the artificial fingerprint forming material is configured to approximate the natural fingerprint oil of a human; contacting the artificial fingerprint forming material with an absorbent material to form an artificial fingerprint contacting surface on at least one surface of the absorbent material; pressing an artificial fingerprint transfer member of a stamping device into contact with the artificial fingerprint contacting surface of the absorbent material; and applying an artificial fingerprint transfer member to a surface of an appliance by pressing the artificial fingerprint transfer member of the stamping device into contact with the surface of the appliance to transfer at least a portion of the artificial fingerprint forming material in an artificial fingerprinting pattern to the surface of the appliance.

In another aspect, the present disclosure includes an appliance surface testing system that includes: an artificial fingerprint solution that is a heated blend of glyceryl trioleate and dissolved artificial fingerprint solution and is configured to approximate the fingerprint oil of a human; and an artificial fingerprint stamp comprising an artificial fingerprint application surface that imitates a human fingerprint and receives and holds at least a portion of the artificial fingerprint solution when the artificial fingerprinting stamp contacts the artificial fingerprint solution.

These and other features, advantages, and objects of the present invention will be further understood and appreciated by those skilled in the art by reference to the following specification, claims, and appended drawings.

DETAILED DESCRIPTION OF THE PRESENT INVENTION

Figure 2:
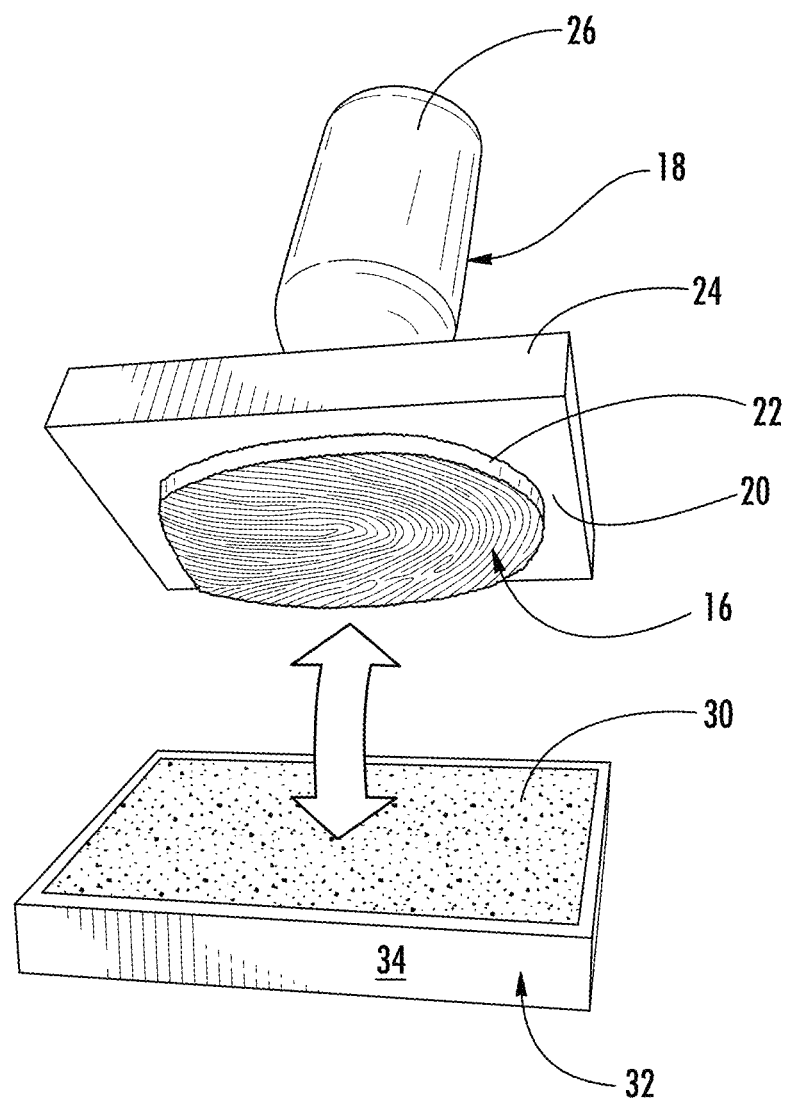
FIG. 2 is a perspective view showing the application of an artificial fingerprint stamp coming into contact with an artificial fingerprint contacting surface of an absorbent material.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The present disclosure is generally directed to the production of an artificial fingerprinting material 10, such as an artificial sebum and the application of the artificial fingerprinting material 10 to the surface 12 of an appliance 14, typically a stainless steel appliance surface. The artificial fingerprinting material 10 is typically a heated solution containing at least glyceryl trioleate and dissolved artificial sebum. An artificial fingerprint transfer member 16, which is typically an elastomeric material such as a rubber stamping material, of a stamping device 18 is placed into contact with an artificial fingerprint contacting surface of an absorbent material 30, which contains the artificial fingerprinting material 10. Consistent artificial fingerprints may be applied to a surface up to 5-6 times (either the same appliance surface or multiple appliances) without applying more artificial fingerprinting material.

The artificial fingerprinting material, as discussed above, is produced by mixing at least glyceryl trioleate and at least one artificial sebum material. Sebum is a fatty lubricant matter secreted by the sebaceous glands of the skin. The artificial sebum material of the present application is any artificial sebum material that approximates the natural sebum of a human. One particularly useful artificial sebum material has the following composition: about 18.0% free fatty acids; about 32.8% beef tallow; about 3.6% fatty acid triglycerides; about 18.3% lanolin; about 3.7% cholesterol; about 12.0% of a mixture of hydrocarbons; about 11.6% CUTINA® by Cognis, which is glycerol monosterate (all percentages are by weight of the artificial sebum material). Glyceryl trioleate $(C_{17}H_{33}COO)_3C_3H_5$ is also known as triolein and glyceryl trioleate and has the following structure:

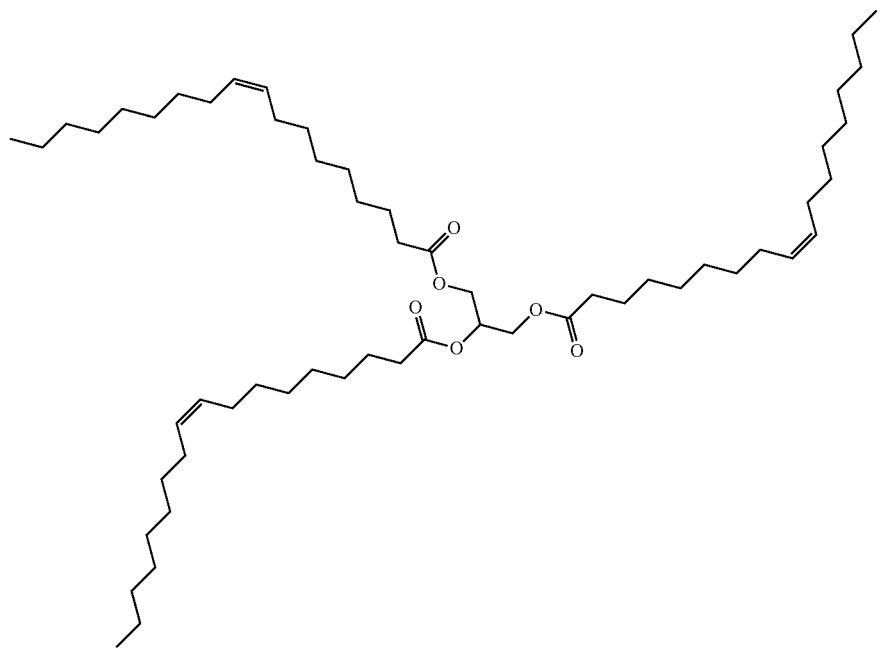 [SMILES: CCCCCCCC/C=C\CCCCCCCC(=O)OCC(COC(=O)CCCCCCC/C=C\CCCCCCCC)OC(=O)CCCCCCC/C=C\CCCCCCCC]

Olein is a triglyceride of oleic acid, which occurs in most fats and oils. It is yellow, has a density of 0.91 g/mL, a melting point of from about 4 to about 5 below zero Celsius. Typically, the glyceryl trioleate and artificial sebum are present in a ratio range by weight of from about 1.1:1 to about 2:1, and more typically from about 1.5:1 to about 1.75:1.

The artificial sebum is typically solid when combined with the glyceryl trioleate. The combination of the solid artificial sebum and the glyceryl trioleate is typically then heated and gently stirred at least occasionally to dissolve the solid artificial sebum and form an artificial fingerprinting solution, which is an artificial sebum liquid. The solid artificial sebum typically must be heated with enough heat, typically to a temperature of at least about 35° C. and up to about 45° C. for approximately 10 minutes, to dissolve the artificial sebum in the glyceryl trioleate. Typically, the artificial sebum and the glyceryl trioleate are the only components of the artificial fingerprinting material or solution, but the artificial sebum and the glyceryl trioleate may contain other solvents as well.

The artificial sebum and the glyceryl trioleate solution may also consist essentially of the artificial sebum and glyceryl trioleate such that only minor amounts of other components are present but not in sufficiently high amounts to alter the functionality of the sebum and glyceryl trioleate solution.

Figure 1:
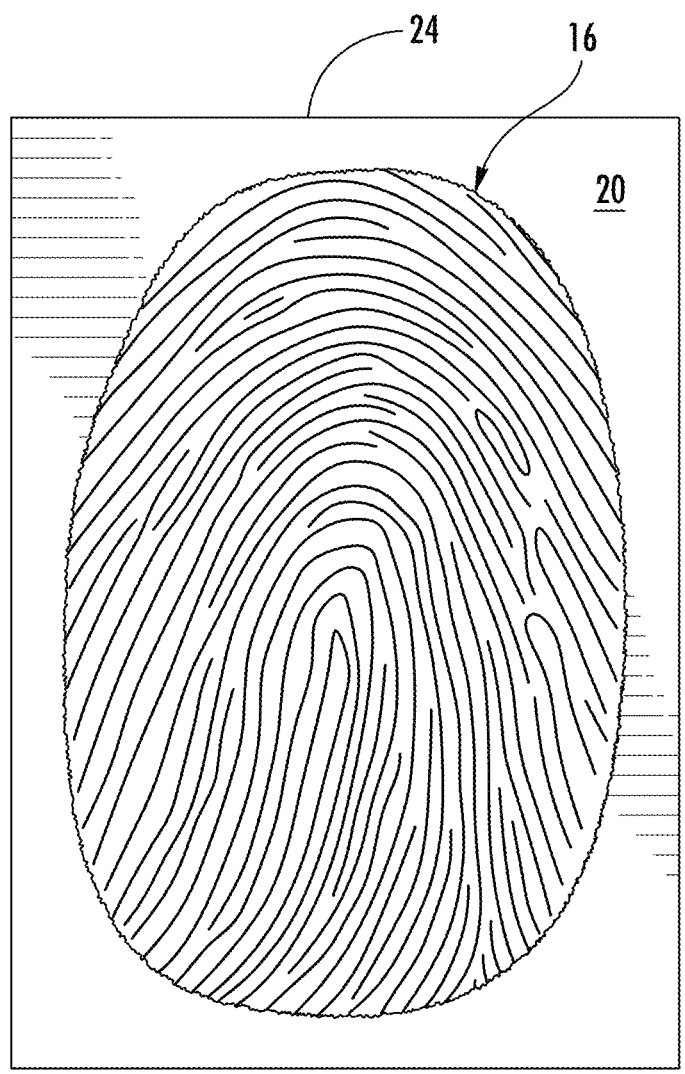
FIG. 1 is a bottom view of an artificial fingerprint stamp showing an artificial fingerprint transfer member that imitates a human fingerprint.

As shown in FIG. 1, the bottom of the stamping device has an artificial fingerprinting stamp transfer member 16, which is typically a rubber stamping material, on the bottom surface of the fingerprint stamping device 18. The perimeter of the bottom surface of the stamping device 20 is typically flat rubber material, but could be plastic or other material. As shown in FIG. 2, the center stamping surface portion 22 typically extends away from the bottom surface of the stamping device 20. All or only a portion of the center stamping surface portion 22 may be the artificial fingerprinting member, i.e. some or all of the center portion may make up the artificial human fingerprint. The fingerprint stamping device base 24 is operably engaged to a handle 26 and has a thickness 28.

As shown in FIG. 2, the fingerprint stamping device 18 is typically disengaged from an absorbent material 30, which may optionally be held in a base portion or tray 32 having at least one upwardly extending sidewall 34 to define an interior volume that receives the absorbent material 30. The base portion 32 may be of any shape. While the base portion 32 is shown in the figures as a hollow rectangular prism, the walls may define any shape such as a cylindrical portion (circular or elliptical cross-section) or an interior volume with a triangular cross section as well, for example. The absorbent material 30 may be a sponge, typically a latex sponge, or other elastic porous mass such as a pad. The sponge may also be a non-latex sponge material.

Figure 3:
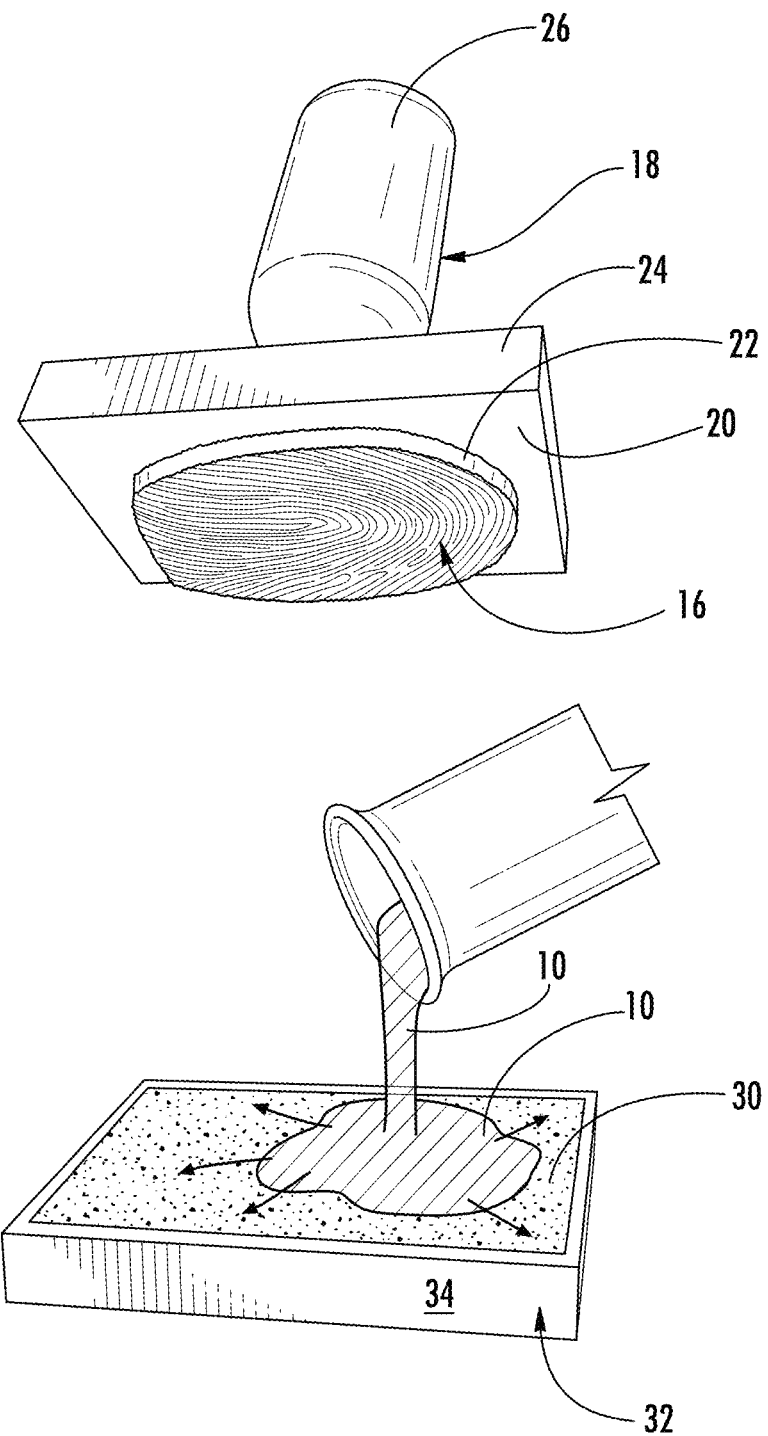
FIG. 3 is a perspective view showing the artificial fingerprint forming material being poured from a container into engagement with the adsorbent material after it is formed.

As shown in FIG. 3, the absorbent material 30 receives the artificial fingerprint forming material 10, which as discussed above is typically a solution of artificial sebum that contains artificial sebum and glyceryl trioleate. Prior to the fingerprint stamping device 18 being applied to or placed in engagement with the absorbent material 30 containing the artificial fingerprint forming material 10, the artificial fingerprint transfer member 16 is typically cleaned with a solvent, typically an organic solvent such as isopropyl alcohol or another alcohol or alcohol mixture, and thereafter dried using a lint-free cloth.

Figure 4:
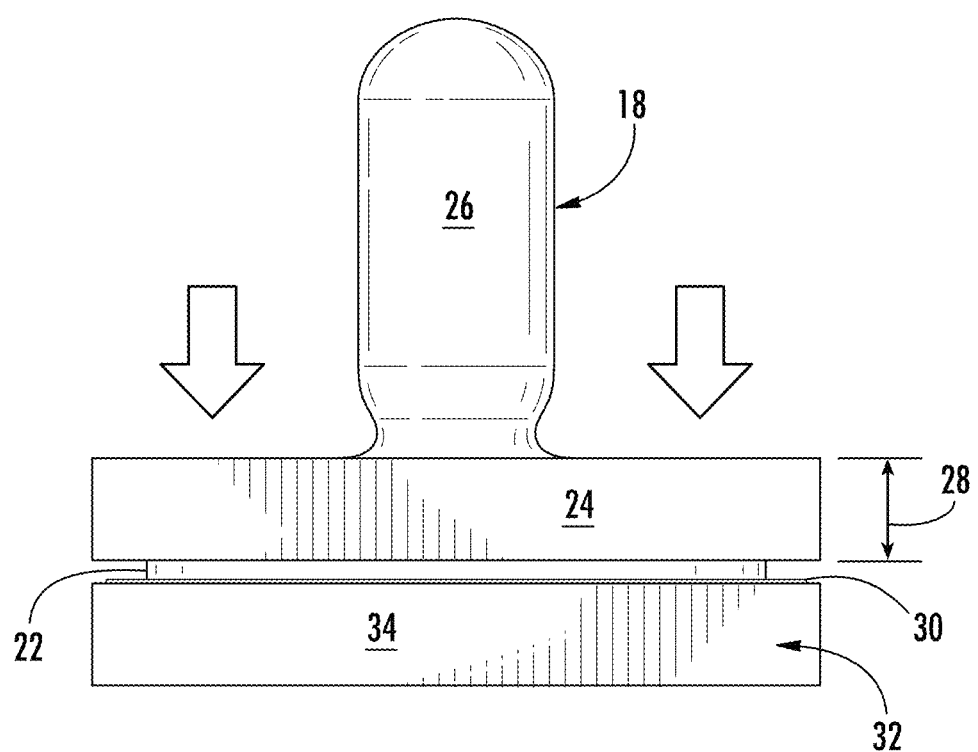
FIG. 4 is a side view of the artificial fingerprint stamp engaged with an artificial fingerprint contacting surface of the absorbent material.
Figure 5:
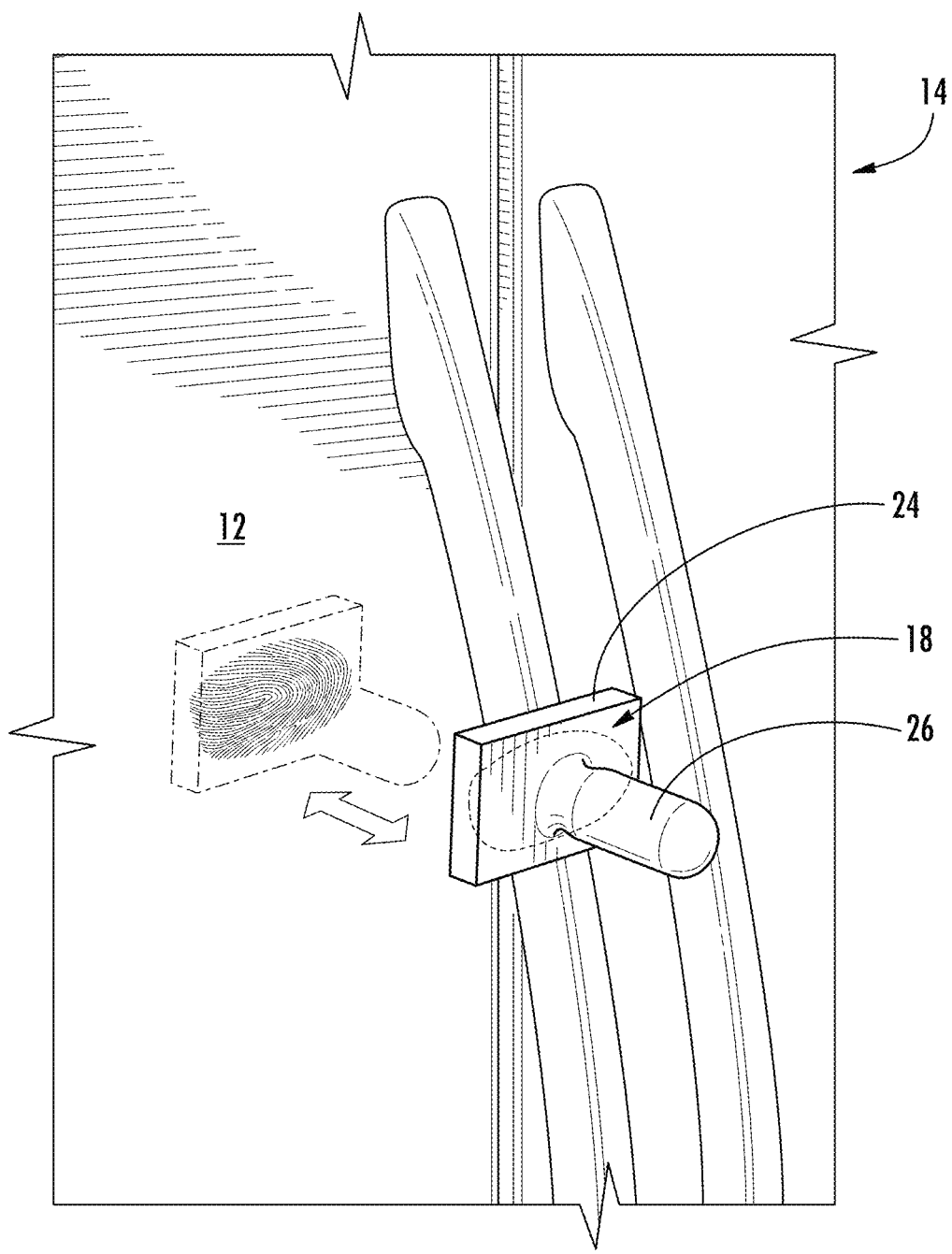
FIG. 5 is a perspective view of the artificial fingerprint stamp being engaged to the surface of a stainless steel appliance to test the fingerprint resistant qualities of the appliance surface.
Figure 6:
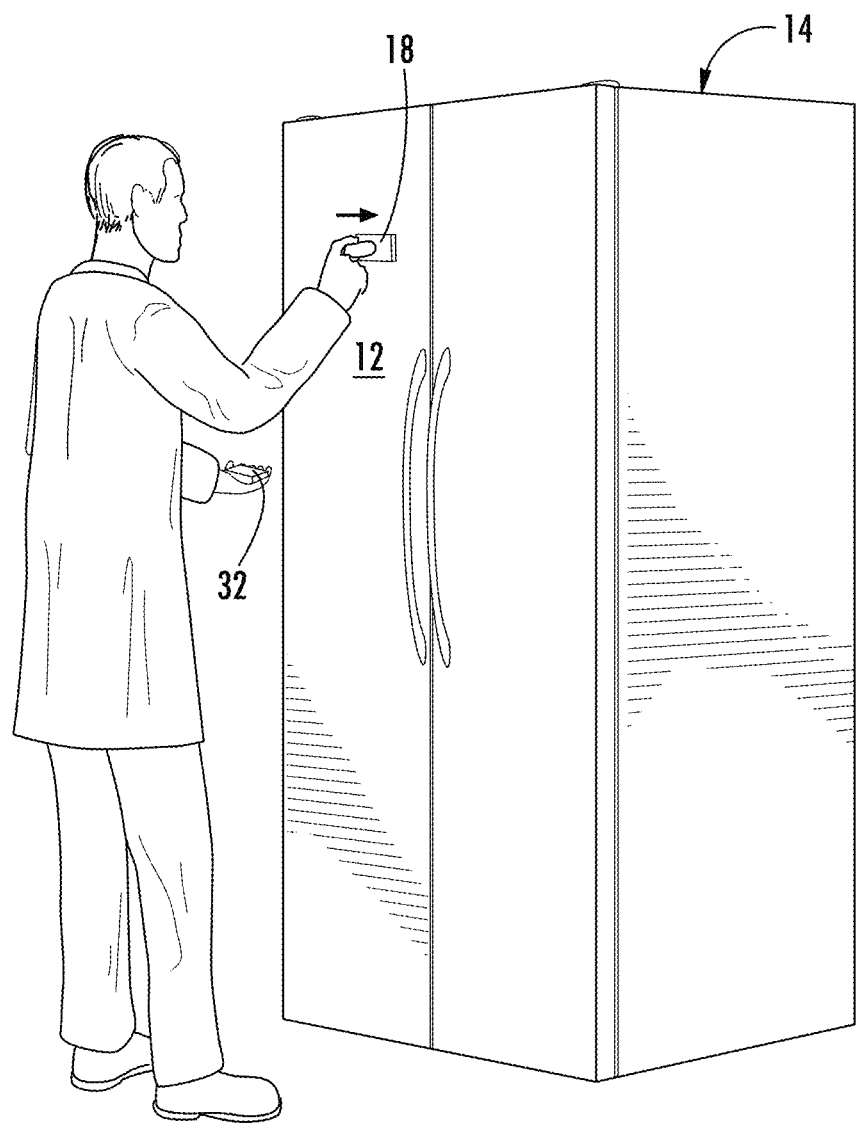
FIG. 6 is a perspective view of the artificial fingerprint stamp being engaged to the surface of a stainless steel appliance to test the fingerprint resistant qualities of the appliance surface.
Figure 7:
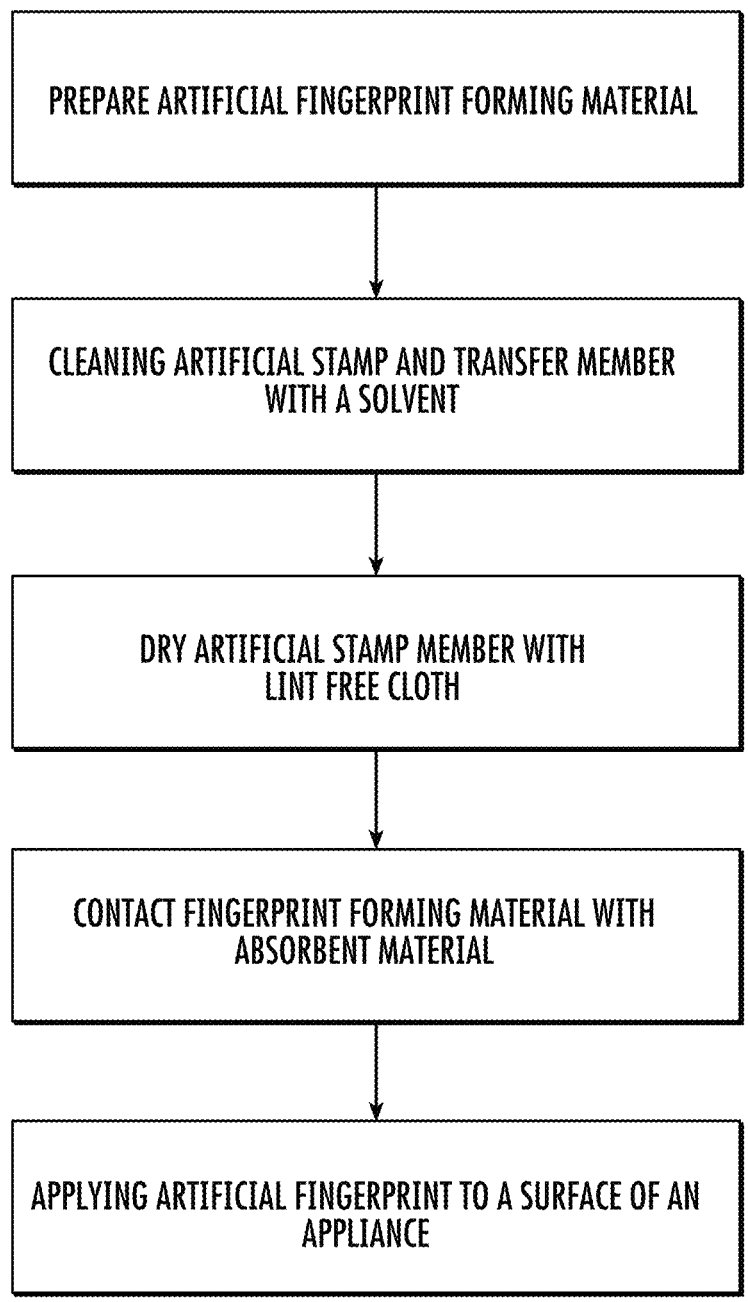
FIG. 7 is a flowchart of a process according to an aspect of the present disclosure.

Next, as shown in FIG. 4, the stamping device is placed into contact with the absorbent material containing the artificial fingerprint forming material with sufficient force to transfer some of the artificial fingerprint forming material 10 onto the surface of the artificial fingerprint transfer member 16. Once on the artificial fingerprint transfer member 16, the artificial fingerprint transfer member is typically wiped on a clean dry cosmetic sponge firmly about three times to remove most of the residual artificial fingerprint forming material, which is an oily material. Thereafter, the stamping device 18 applies the artificial fingerprint forming material 10 to a surface of an appliance, typically a stainless steel surface of an appliance such that an artificial fingerprint is formed as shown in FIGS. 5-6. The contact pressure of the stamp to the appliance surface is less critical because the residual artificial fingerprint forming material has been removed. Once applied to the surface of the appliance, the person applying the fingerprint may apply additional fingerprints to the same surface or additional surfaces up to about 5-6 times prior to having to clean and dry the artificial fingerprinting transfer member 16 (stamp portion) using a solvent and lint-free cloth as discussed above.

Figure 8:
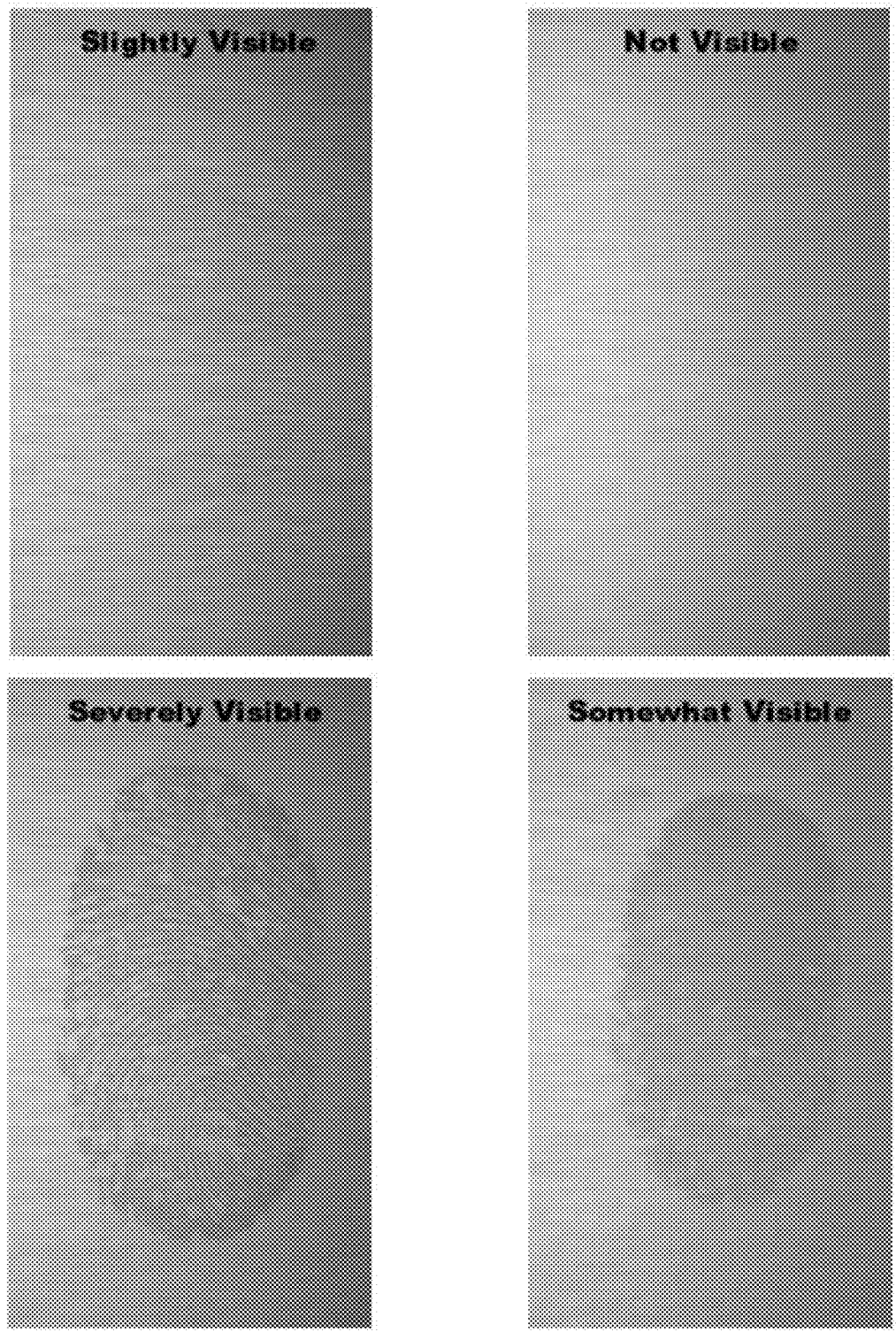
FIG. 8 is an example of a fingerprint visibility scale.

The user may evaluate the visibility of the artificial fingerprint on the surface of the appliance using a fingerprint visibility scale that may be a fingerprint scale such as the scale shown in FIG. 8 or a scale shown on a display. The system/kit of one or more of the components of the present invention may also be used on a sales floor to demonstrate the fingerprint resistant qualities (or lack thereof) of various appliance surfaces. Typically, a comparison is conducted on stainless steel appliances because these appliances tend to readily display fingerprints from a human. Since the stamping device does not have to be recharged with additional artificial fingerprint forming material for up to 5-6 applications, the fingerprint resistance qualities of a variety of appliances can be demonstrated easily and quickly. The salesperson or comparer can simply apply substantially the same artificial fingerprint to multiple surfaces quickly. The artificial fingerprint applied to the multiple surfaces may then be easily viewed by a potential purchaser of the appliance. Such purchasers are often influenced by the ability of an appliance surface to not display fingerprints on the surface, which would require cleaning. Evaluation by the consumer is typically done by the naked eye.

The system could also be used in a laboratory setting in order to test fingerprint resistant coatings for appliances prior to the commercialization of such coatings. If adopted, the system could be used as a standard for grading such appliance surfaces' ability to resist natural human fingerprints in a home due to the use of a standardize artificial fingerprint forming material (solution), the solution that is typically glyceryl trioleate and artificial sebum, and a standard application process and device.

When evaluating the visibility of the artificial fingerprints applied to the surface of the appliance, the evaluation may be conducted under Kelvin temperatures from about 2500K to about 5500K. Non-limiting examples include illuminants A (incandescent with a Kelvin temperature of 2500K, F2 (cool white florescent with a Kelvin temperature of 4200K), and U3000 (Ultralume 3000, a warm white, narrow tri-band fluorescent lamp, F12, or U30 with a Kelvin temperature of 3000K) light sources. Also each panel of the appliance with the artificial fingerprint may be evaluated with a brush oriented both horizontally and vertically or in a vertical application, a travel (panel moving) evaluation environment and/or a flat panel application evaluation (the panel placed horizontally).

The components of the present disclosure may also be combined into a kit for distribution and use by a retailer or research group, for example. The kits might include written instructions regarding the application process and cleaning and drying steps. The kit(s) would also typically include a (previously) heated blend of glyceryl trioleate and dissolved artificial sebum (now at room temperature) configured to approximate the fingerprint oil of a human and an artificial fingerprint stamping device. The kit may also include a fingerprint visibility scale on a printed sheet of material, typically paper or plastic, or a display to show a fingerprint visibility scale.

The invention claimed is:

1. A process comprising the steps of:
preparing an artificial fingerprint forming material by combining at least glyceryl trioleate and an artificial sebum and heating the artificial fingerprint forming material to form the artificial fingerprint forming material, wherein the artificial fingerprint forming material is configured to approximate the natural fingerprint oil of a human;
contacting the artificial fingerprint forming material with an absorbent material to form an artificial fingerprint contacting surface on at least one surface of the absorbent material;

pressing an artificial fingerprinting transfer member of a stamping device into contact with the artificial fingerprint contacting surface of the absorbent material; and applying the artificial fingerprint transfer member to a surface of an appliance by pressing the artificial fingerprint transfer member of the stamping device into contact with the surface of the appliance to transfer at least a portion of the artificial fingerprint forming material in an artificial fingerprinting pattern to the surface of the appliance.

2. The process of claim 1, wherein the step of contacting the artificial fingerprint forming material with an absorbent material comprises pouring the artificial fingerprint forming material onto the surface of a latex sponge.

3. The process of claim 1, wherein the absorbent material is a sponge and the artificial sebum is solid when combined with the glyceryl trioleate prior to the heating step.

4. The process of claim 3, wherein the sponge is a latex sponge and the surface of the appliance is a stainless steel surface.

5. The process of claim 1, wherein the step of applying the artificial fingerprint transfer member to a surface of an appliance comprises stamping up to about 5 different appliance surfaces after once pressing the stamping device onto the fingerprinting blend contacting surface of the absorbent material and wherein the step of evaluating the visibility of the artificial fingerprint pattern on the surface of the appliance is conducted by a potential purchaser or a plurality of appliances on a sales floor.

6. The process of claim 1 further comprising the steps of:
cleaning the artificial fingerprint transfer member by contacting the artificial fingerprint transfer member with a solvent; and
drying the artificial fingerprint transfer member using a lint free cloth.

7. The process of claim 1, wherein the heated dissolved fingerprinting blend of glyceryl trioleate and artificial sebum are present in a ratio range by weight of from about 1:1 to about 2:1 and the surface of the appliance is a stainless steel surface.

8. The process of claim 7, wherein the heated dissolved fingerprinting blend of glyceryl trioleate and artificial sebum are present in a ratio range by weight of from about 1.75:1.

9. The process of claim 1, wherein the step of preparing the artificial fingerprint forming material includes combining at least the glyceryl trioleate and the artificial sebum and heating the combination of at least the glyceryl and trioleate to form a dissolved artificial fingerprint forming solution.

10. The process of claim 9 further comprising the step of evaluating the extent to which at least one artificial fingerprint applied to the surface or surfaces is visible to the naked eye.

11. The process of claim 1, wherein the artificial fingerprint forming material consists essentially of glyceryl trioleate and artificial sebum.

12. A process comprising the steps of:
preparing an artificial fingerprint forming material comprising glyceryl trioleate and an artificial sebum wherein the artificial sebum comprises glycerol monostearate by heating the artificial fingerprint forming solution to form the artificial fingerprint forming material, wherein the artificial fingerprint forming solution is configured to approximate the natural fingerprint oil of a human;
contacting the artificial fingerprint forming solution with an absorbent material to form an artificial fingerprint contacting surface on at least one surface of the absorbent material;

pressing the artificial fingerprinting transfer member of a stamping device into contact with the artificial fingerprint contacting surface of the absorbent material; and applying an artificial fingerprint transfer member to a surface of an appliance by pressing the artificial fingerprint transfer member of the stamping device into contact with the surface of the appliance to transfer at least a portion of the artificial fingerprint forming solution in an artificial fingerprinting pattern to the surface of the appliance.

13. The process of claim 12, wherein the artificial sebum further comprises free fatty acids, beef tallow, fatty acid triglycerides, and lanolin.

14. The process of claim 12, further comprising the steps of:
cleaning the artificial fingerprint transfer member by contacting the artificial fingerprint transfer member with a solvent; and
drying the artificial fingerprint transfer member using a lint free cloth; and
wherein the heated dissolved fingerprinting blend of glyceryl trioleate and artificial sebum are present in a ratio range by weight of from about 1:1 to about 2:1 and the surface of the appliance is a stainless steel surface.

15. The process of claim 14, wherein the heated dissolved fingerprinting blend of glyceryl trioleate and artificial sebum are present in a ratio range by weight of from about 1.75:1.

16. The process of claim 12 further comprising the step of evaluating the extent to which at least one artificial fingerprint applied to the surface or surfaces is visible to the naked eye.

17. A process comprising the steps of:
preparing a liquid artificial fingerprint forming material comprising glyceryl trioleate and a solid artificial sebum by combining the glyceryl trioleate and the solid artificial sebum and heating the glyceryl trioleate and the solid artificial sebum to dissolve the solid artificial sebum and form the liquid artificial fingerprint forming material, wherein the liquid artificial fingerprint forming material is configured to approximate the natural fingerprint oil of a human;
contacting the artificial fingerprint forming material with an absorbent material to form an artificial fingerprint contacting surface on at least one surface of the absorbent material;
pressing an artificial fingerprinting transfer member of a stamping device into contact with the liquid artificial fingerprint contacting surface of the absorbent material; and
applying the artificial fingerprint transfer member to a surface of an appliance by pressing the artificial fingerprint transfer member of the stamping device into contact with the surface of the appliance to transfer at least a portion of the artificial fingerprint forming material in an artificial fingerprinting pattern to the surface of the appliance.

18. The process of claim 17, wherein the liquid artificial fingerprint forming material consists essentially of glyceryl trioleate and dissolved artificial sebum and the heated dissolved fingerprinting blend of glyceryl trioleate and artificial sebum are present in a ratio range by weight of from about 1:1 to about 2:1 and the surface of the appliance is a stainless steel surface.

19. The process of claim 18, wherein the heated dissolved fingerprinting blend of glyceryl trioleate and artificial sebum are present in a ratio range by weight of from about 1.75:1.

20. The process of claim 17 further comprising the step of evaluating the extent to which at least one artificial fingerprint applied to the surface or surfaces is visible to the naked eye and wherein the liquid artificial fingerprint forming material consists of glyceryl trioleate and dissolved artificial sebum and optionally one or more other solvents.

* * * * *